Feb. 6, 1934. P. B. CAMP ET AL Re. 19,072
BRAKE MECHANISM FOR RAILWAY CARS
Original Filed Dec. 6, 1924 3 Sheets-Sheet 1
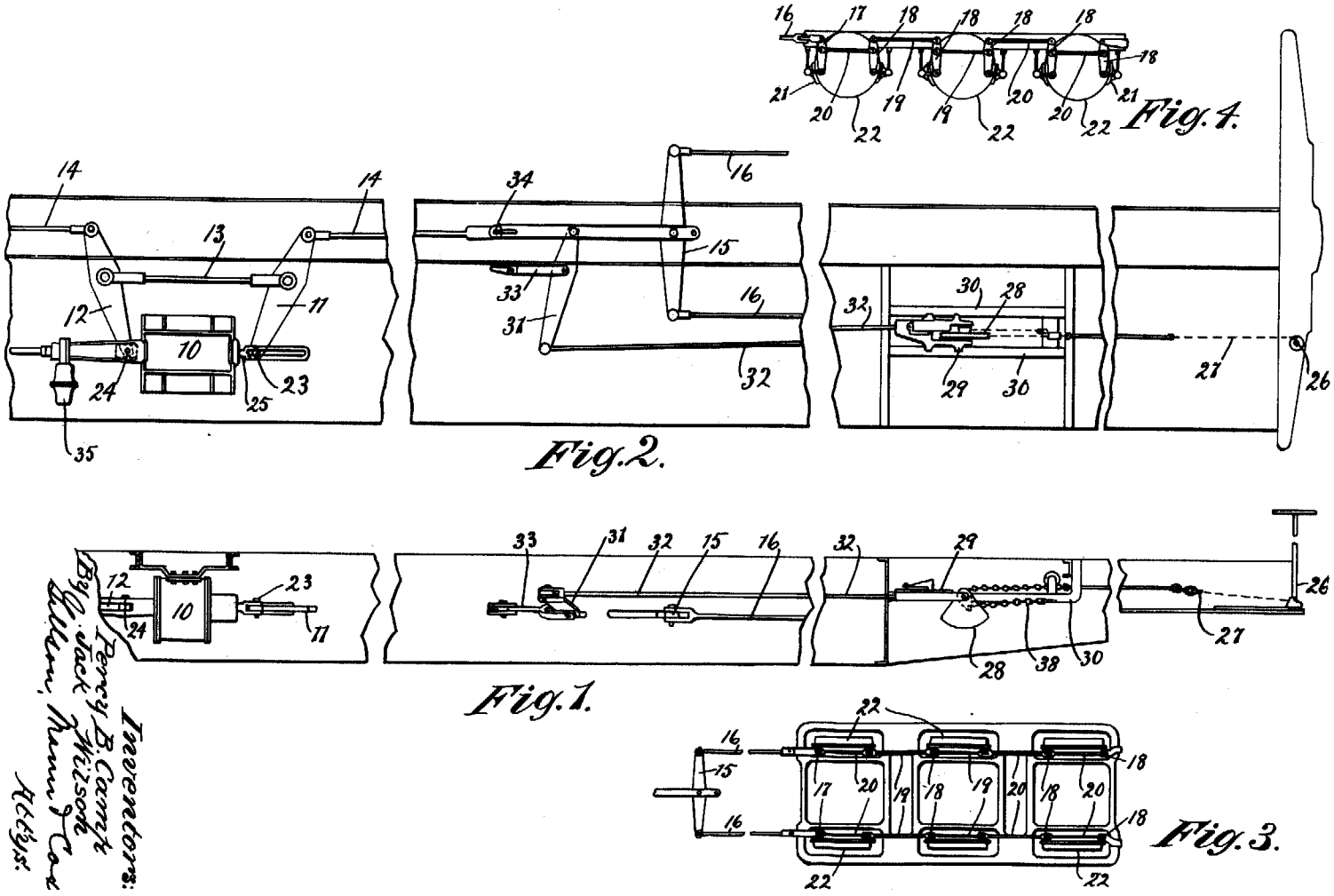
Inventors:
Percy B. Camp
Jack Wilson
By Gilson, Manning & Cox
Atty's.

Feb. 6, 1934. P. B. CAMP ET AL Re. 19,072

BRAKE MECHANISM FOR RAILWAY CARS

Original Filed Dec. 6, 1924 3 Sheets-Sheet 2

Inventors
Percy B. Camp
Jack Wilson
By Gellon, Mann & Coe
Atty's.

Feb. 6, 1934. P. B. CAMP ET AL Re. 19,072

BRAKE MECHANISM FOR RAILWAY CARS

Original Filed Dec. 6, 1924 3 Sheets-Sheet 3

Inventors:
Percy B. Camp
By J. Jack Wilson
Gillson Mann & Co
Atty's

Reissued Feb. 6, 1934

Re. 19,072

UNITED STATES PATENT OFFICE 19,072

BRAKE MECHANISM FOR RAILWAY CARS

Percy B. Camp, Maywood, and Jack Wilson, Chicago, Ill., assignors to Universal Draft Gear Attachment Co., a corporation of Illinois Original No. 1,623,304, dated April 5, 1927, Serial No. 754,287, December 6, 1924. Application for reissue September 26, 1928. Serial No. 308,567

23 Claims. (Cl. 188—200)

This invention relates to brake mechanisms for railway cars and has for its principal object to maintain the slack in the foundation brake gear and the hand brake at a constant value; to adjust the hand brake to compensate for an increase in slack in the foundation brake gear, and to make the movement incident to applying the brakes by means of the brake cylinder, shorten the hand brake as the slack in the foundation brake gear increases.

Further objects and advantages of the invention will become apparent as the disclosure proceeds and the description is read in connection with the accompanying drawings illustrating a selected embodiment of the invention, and in which Fig. 1 is a side elevation of a car underframe, illustrating a brake mechanism embodying the present invention, parts being broken away;

Fig. 2 is a plan view of the same;

Figs. 3 and 4 are plan and side elevations of a six-wheel truck equipped with clasp brakes;

Figure 5:
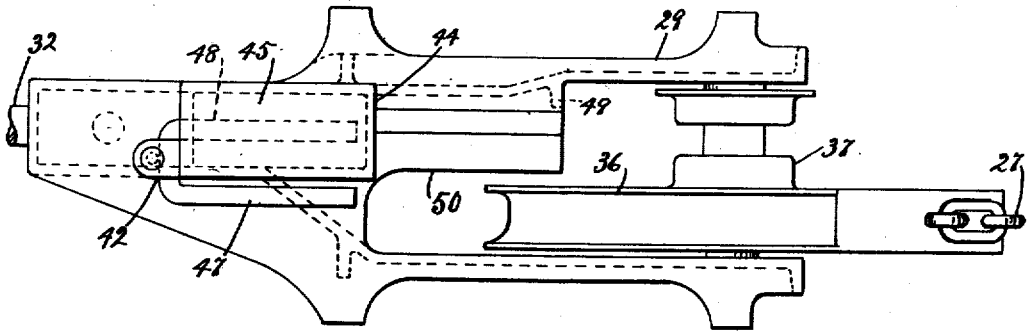
Fig. 5 is a plan view of an automatic slack adjuster for the hand brake and one form of multiplying lever that will first multiply the speed of the brake staff to quickly take up the slack and then multiply the power of the brake staff to apply the brakes.

The invention is particularly advantageous in connection with brake mechanisms of the kind disclosed in the patent to William H. Clegg, No. 1,558,840, issued October 27, 1925, and for convenience is illustrated in connection therewith.

Referring to sheet 1, (Figs. 1, 2, 3 and 4) 10 indicates a conventional brake cylinder that operates the cylinder levers 11 and 12, cooperating through the cylinder lever connection 13, to transmit power of the cylinder to the cylinder lever and floating lever connections 14 from which it is communicated to the floating lever 15, and, in turn, through the rods 16, to the brake levers 17, which cooperate with brake levers 18 through the rods 19 and 20 to press the brake shoes 21 against the wheels 22. The cylinder lever 11 is fulcrumed at 23 on the push rod 25 of the cylinder, and the cylinder lever 12 is fulcrumed to a movable cross-head at 24 which is adjustably connected to the pressure head of the cylinder 10.

The hand brake includes a brake staff 26 adapted to wind up a chain 27 and operate a multiplying lever 28 carried in a jaw 29 suitably supported on guides or supports 30 and connected with the hand brake lever 31 by the hand brake rod 32. The hand brake lever is carried by a hand brake lever fulcrum 33, mounted beneath the car and is attached to the foundation brake gear in this instance by fastening it to the cylinder lever and floating lever connection 14. This connection has a sliding joint 34 which permits the hand brake at one end of the car to apply the brakes to one truck without applying them to the other truck.

In all types of brake mechanism, wear on the brake shoes increases the slack in the foundation brake gear and in order to make the travel of the piston in the cylinder 10 substantially constant, it is necessary to compensate for this increase of slack.

This is done by what is known as a slack adjuster 35 (Fig. 2) which moves the fulcrum of the cylinder lever 12 to the left as the slack increases. The operation of this device is well known and a description may be found on page 841 of the Car Builder's Encyclopedia, 1922, published by Simmons-Boardman Publishing Co.

Figure 6:
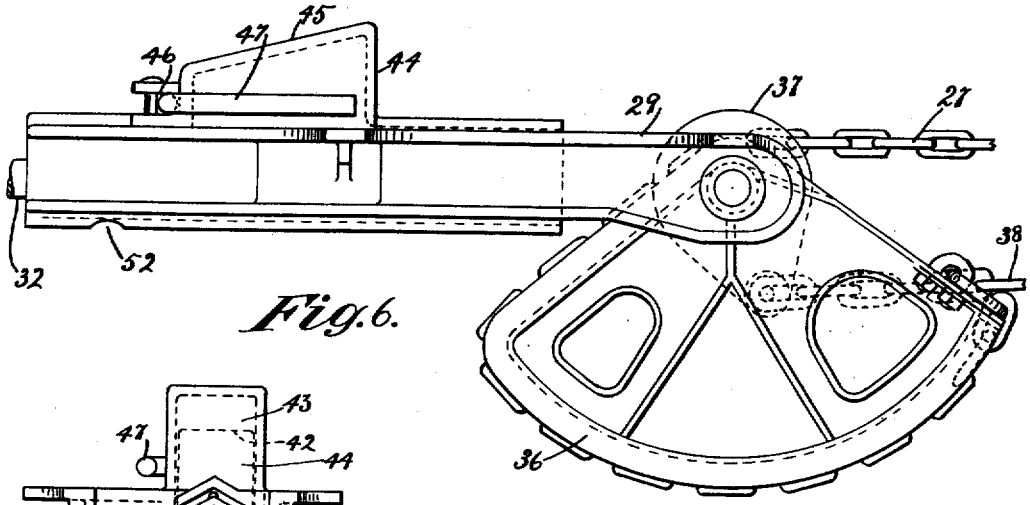
Fig. 6 is a side elevation of the same.
Figure 7:
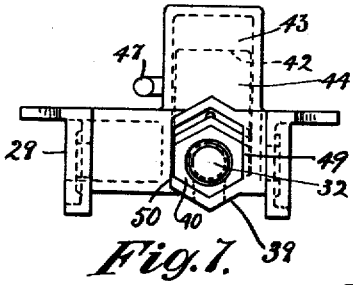
Fig. 7 is an end view of the automatic slack adjuster.

Heretofore, however, there has been no corresponding means to make the throw of the hand brake constant which becomes especially important with the devices for quickly taking up a given amount of slack and then changing the mechanical advantage to apply the brakes with pressure comparable to that of the air brakes. For example, in Figs. 5 and 6, the multiplying lever has a sector shaped arm 36 which receives the power of the brake staff from the chain 27 and cooperates with the shorter arm 37 anchored to the car by chain 38 to move the jaw 29 with speed or power, as the case may be. This is fully set forth in the patent to Clegg, above referred to, and it will suffice here to say that with the parts in the position shown in Fig. 6, a slight movement of the chain 27 will revolve the lever through 90°, during which movement it multiplies the speed and takes up the slack, then upon further movement of the chain 27, the multiplying lever rotates slowly, and multiplies the power. If the slack in the brake mechanism exceeds the amount taken up by approximately a quarter of a turn of the multiplying lever, the efficiency of the device is reduced and the time necessary for applying the brakes is correspondingly increased.

According to the present invention, the slack is maintained at a substantially constant value by shortening the hand brake and the motion incident to applying the brakes with air pressure is used to make the compensating adjustment.

In the construction shown in Figs. 5, 6, 7 and 8, sheet 2, the jaw 29 is equipped with a guide or housing 39 of hexagonal cross section within which is a rack 40 of similar cross section having teeth 41 on its upper faces for cooperation with a pawl 42, housed in a pocket 43 or recess on top of the guide. In all brake mechanisms the hand brake is operatively connected with the foundation brake gear and some of its parts move each time the brakes are applied by the air pressure. In this instance, each application of the brakes by the air pressure rocks the hand brake lever 31 and reciprocates the hand brake rod 32. By connecting the rack 40 to this hand brake rod, the rack is made to partake of that movement. When the travel of the piston does not exceed the normal, the rack 40 will merely move to the right (Fig. 8) in the guide or housing 39, and then back again to the position shown, the pawl 42 traveling with the rack without releasing it. However, should the wear on the brake shoes cause the piston travel to exceed the normal, the rack would move further to the right and the pawl 42, coming in contact with the wall 44 of the pocket or recess 43, would be checked. If the rack 40 continues to the right the width of one tooth 41, the pawl will ride upwardly in the pocket 43 and drop into the next set of notches. Then, when the brakes are released and the parts assume their normal slack position, the hand brake will be shorter by the width of one tooth 41.

Subsequent brake applications will produce a reciprocation of the rack and pawl without changing their engagement until the slack increases sufficiently to let the rack move beyond the normal width of one tooth, when another compensating adjustment will take place. This will continue until the brake shoes are worn down to the point where replacement is necessary.

By inclining the upper wall 45 of the pocket 43, the pawl 42 is automatically locked in engagement with the rack when any stress is to be transmitted and is permitted to release the rack by riding up the inclined faces of the teeth 41 when an adjustment is to be made. In order to restore the pawl to normal position, at the right end of the rack when new brake shoes are put in, the rack is pushed to the right manually and the pawl is raised and the rack slid back to the left and the pawl lowered. The position of the pawl is controlled manually by the U-shaped yoke pivoted at 46 having one arm 47 serving as a handle, while the other arm 48, extends through the pawl.

The right end of the guide is equipped with a stop 49. For convenience in manufacture, this stop may be cast integral with the guide. The upper and lower faces of the rack conform to the corresponding faces in the guide, but the lateral faces of the rack are shorter than the corresponding faces on the guide which results in ample clearance between the teeth and the upper portion of the guide. This difference in size also makes possible the assembly of the guide and the rack. The side of the guide next to the arm 36 of the multiplying lever is cut away along the line 50 (see Figs. 5 and 7). By tilting the rack to the left in Fig. 7, it may be inserted into the guide past the stop 49.

Figure 8:
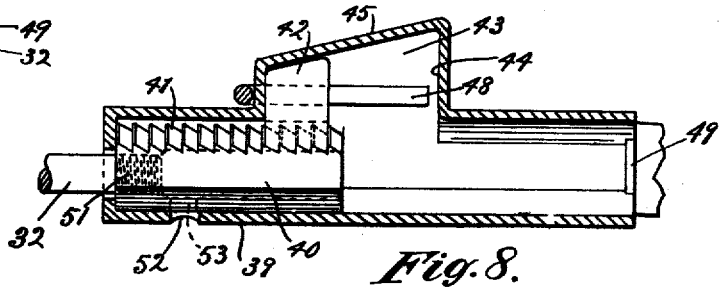
Fig. 8 is a longitudinal sectional view of the automatic slack adjuster.
Figure 9:
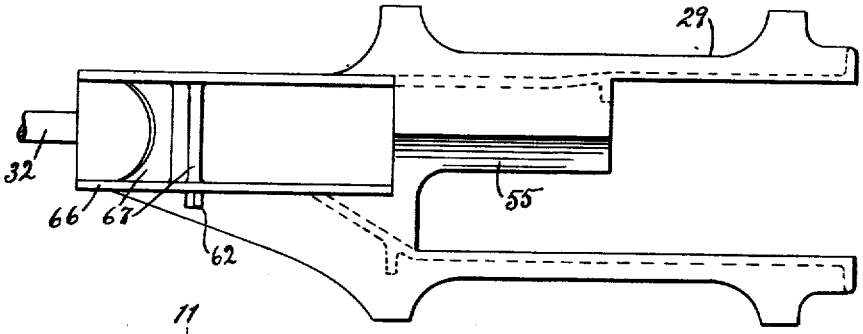
Fig. 9 is a plan view of an alternative form.
Figure 10:
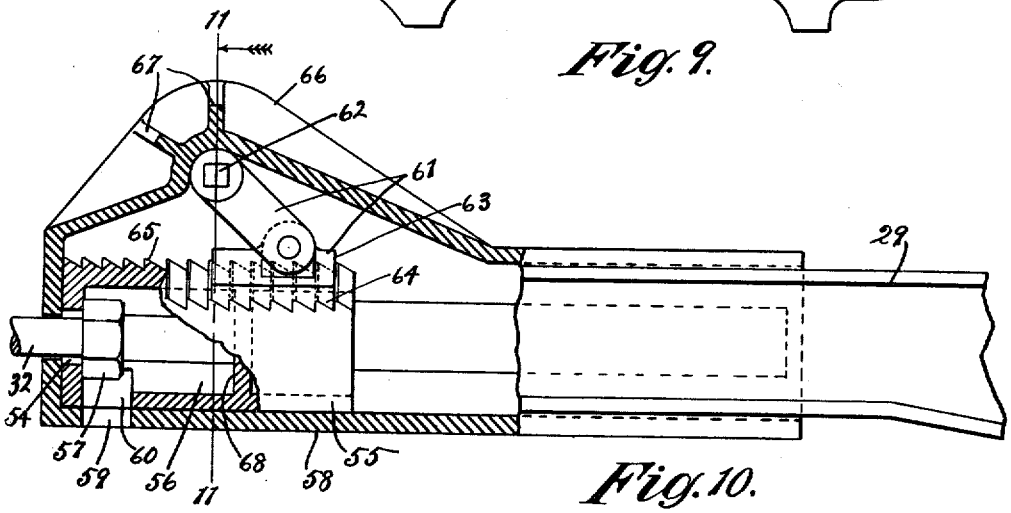
Fig. 10 is a partial, longitudinal, sectional view of the form shown in Fig. 9.
Figure 11:
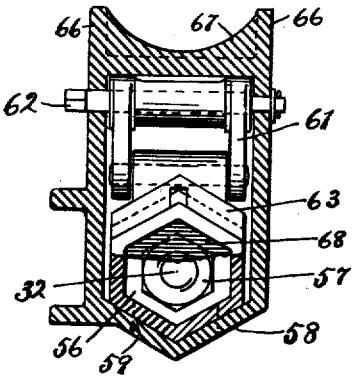
Fig. 11 is a partial, transverse section taken on line 11—11 of Fig. 10.
Figure 12:
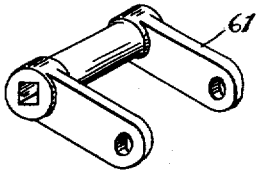
Fig. 12 is a perspective view of the pawl used in the modified construction.

In the form shown in Fig. 8 the rack 40 is threaded to the rod 32, as shown at 51, and the guide and rack are provided with aligned openings 52 and 53 to permit the operator to see when the threaded engagement is complete.

In the alternative form illustrated in Figs. 9, 10, 11 and 12, sheet 3, the brake rod 32 extends through an aperture 54 in the end of a rack 55 which is provided with a chamber 56, receiving a nut or collar 57 on the end of the brake rod and permitting it free relative movement of the length corresponding to the normal piston travel. The rack is mounted in a guide 58, similar to the guide 39, and for convenience, they are provided with aligned openings 59 and 60 through which the nut 57 may be inserted in assembling. The pawl 61 is pivoted at 62 in an enlargement of the guide and carries at its free end a pivoted jaw 63, having teeth 64, for cooperation with the corresponding teeth 65 on the rack 55. The guide is provided with longitudinal flanges 66 connected by reinforcing ribs 67 to give it ample strength to withstand the thrust on the pawl.

In this construction a normal piston travel merely causes the nut 57 on the brake rod 32 to move forward and back in the chamber 56. Any additional piston travel will result in the nut striking the rear wall 68 of the chamber 56, and the rack will begin to move to the right in Fig. 10. If this movement continues for the length of a tooth 65, the pawl will drop into the next space between teeth and thus shorten the hand brake and compensate for that amount of slack in the foundation brake gear.

The invention, whether embodied in the forms illustrated or otherwise, provides means for automatically taking up the hand brake to compensate for an increase of slack and therefore keeps the slack in the mechanism as a whole at substantially constant value thereby maintaining the operation of applying brakes by hand at a uniform standard.

Use has been made of specific description and illustration in order to disclose the invention, but it is intended that nothing contained herein shall unnecessarily limit the following claims, or require a construction thereof that would permit the substance of the invention to be used without infringement.

We claim as our invention:

1. In a brake mechanism, the combination of a foundation brake gear, a brake cylinder for operating the foundation brake gear, and a hand brake for operating the foundation brake gear, including a hand power device, and means connecting the hand power device and the foundation brake gear automatically operable to adjust the hand brake during the brake applying movement of the foundation brake gear by air to compensate for slack.

2. In a brake mechanism, the combination of a foundation brake gear, a brake cylinder for operating the foundation brake gear, and a hand brake for operating the foundation brake gear, including relatively movable elements operated when the brakes are applied by air pressure to adjust the hand brake to compensate for slack in the foundation brake gear.

3. In a brake mechanism, the combination of a foundation brake gear, a brake cylinder for operating the foundation brake gear, and a hand brake for operating the foundation brake gear, including an element moving with the foundation brake gear when the air pressure is applied and a second element cooperating with said moving element to shorten the hand brake to compensate for slack in the foundation brake gear when the movement of the first element under the action of the air pressure exceeds a predetermined amount.

4. In a brake mechanism, the combination of a foundation brake gear, a brake cylinder for operating the foundation brake gear, and a hand brake for operating the foundation brake gear, including two elements one of which moves with the foundation brake gear when the air pressure is applied, and means permitting free relative movement of said elements in one direction and limiting their relative movement in the reverse direction, whereby the hand brake is automatically adjusted upon the movement of one element with the foundation brake gear during the application of the brakes by air.

5. In a brake mechanism, the combination of a foundation brake gear, a brake cylinder for operating the foundation brake gear, and a hand brake for operating the foundation brake gear, including a rack and pawl mechanism operated by the application of the brakes with air pressure to shorten the hand brake.

6. In a brake mechanism, the combination of a foundation brake gear, a brake cylinder for operating the foundation brake gear, and a hand brake for operating the foundation brake gear including a rack moving when the air pressure is applied, a pawl cooperating with the rack upon excess movement of the rack by the air pressure to automatically adjust the hand brake to compensate for slack.

7. In a brake mechanism, the combination of a foundation brake gear, a brake cylinder for operating the foundation brake gear, and a hand brake for operating the foundation brake gear including two elements, one of which moves with the foundation brake gear when the same is operated by the brake cylinder, and means permitting free relative movement of said elements in both directions within a selected range of travel, but curtailing the reverse movement when that range is exceeded.

8. In a brake mechanism, the combination of a foundation brake gear, a brake cylinder, a piston in the brake cylinder connected with the foundation brake gear, a hand brake for operating the foundation brake gear, including means operated by the movement of the piston during an air brake application to automatically adjust the hand brake to compensate for slack when the piston exceeds its normal travel.

9. In a brake mechanism, the combination of a foundation brake gear, a brake cylinder, a piston in the brake cylinder connected with the foundation brake gear, a hand brake for operating the foundation brake gear, including two relatively movable elements, one of which is constrained to travel with said piston, and means to shorten the reverse movement of the last mentioned element relative to the other element when the piston exceeds its normal travel.

10. In a brake mechanism, a foundation brake gear, a brake cylinder for operating the foundation brake gear, a hand brake for operating the foundation brake gear, including means to take up the slack quickly and then apply the braking pressure, and means to shorten the hand brake to compensate for an increase of slack in the foundation brake gear.

11. In a brake mechanism, a foundation brake gear, a brake cylinder for operating the foundation brake gear, a hand brake for operating the foundation brake gear, including means to take up the slack quickly and then apply the braking pressure, and means for maintaining the slack in the hand brake and foundation brake gear substantially constant.

12. In combination with a foundation brake rigging of a railway vehicle, a bodily movable power multiplying device having a limited increasing effective range of movement and independently operable means for substantially instantaneously regulating the entire brake rigging and simultaneously resetting said power multiplying device.

13. In combination with a foundation brake rigging of a railway vehicle including an air brake, means for instantaneously regulating the entire brake rigging and a hand operable means for applying the brakes independently of the air brake, including a bodily movable power multiplying means adapted to produce progressively increasing power with progressively decreasing rate of movement.

14. In a brake mechanism, a relatively fixed support, a rod, a guide carried by and bodily movable along the support and having a passage receiving the rod, said rod and guide having coacting means held in fixed engagement when the parts are in normal operative position, said guide having means permitting said coacting means to move temporarily out of operative holding relation when the mechanism is being regulated, said coacting means thereafter assuming their normal position.

15. In combination with a lever of a brake mechanism, a regulator therefor including a ratchet bar operatively connected to the lever, a guide into which the ratchet bar extends, a pawl in the guide, means to hold said pawl in engagement with the ratchet bar thereby to travel with said ratchet bar an amount equal to full brake shoe clearance, said guide and pawl having corresponding apertures to receive a pin for holding the pawl released.

16. A regulator for use with the brake rigging of a railway car comprising an elongated member having a bearing opening at one of its ends, a ratchet rod passing into said bearing opening, permanent take up and holding means including a pawl coacting with said ratchet rod and freely supported thereon adapted to have a free relathe movement between the ends of said elongated member during regulation an amount substantially proportional to total brake shoe clearance prior to performing any take up action on said rod, and means adapted to hold said pawl in engagement with said rod.

17. In combination with a lever of the foundation brake gear, a regulator therefor including a ratchet bar, a freely floating pawl cooperating with said ratchet bar, and means for holding said pawl in unyielding engagement with said ratchet bar except during the regulating operation.

18. In combination with a lever of the foundation brake gear, a regulator including a ratchet bar connected operatively to said lever at one end, a pawl cooperating with said ratchet bar, and a housing into which said bar extends and in which said pawl is freely floating, said housing having an enlarged portion into which said pawl moves during the regulating operation, thereby to permit release of the pawl from the ratchet.

19. In combination with a lever of the foundation brake gear, a regulator therefor including a ratchet bar having an operative connection with said lever, a housing into which said ratchet bar extends, a pawl in said housing, means positively to hold said pawl in engagement with said ratchet bar thereby to travel with said ratchet bar an amount equal to total brake shoe clearance, and means permitting the ratchet bar to move relative to said pawl upon excess travel of the brakes during the regulating movement.

20. In combination with a lever of the foundation brake gear, a regulator therefor including a ratchet bar having an operative connection with said lever, a housing into which said ratchet bar extends, a pawl in said housing, means to hold said pawl in engagement with said ratchet bar thereby to travel with said ratchet bar an amount equal to full brake shoe clearance, and means to hold the pawl released from said ratchet bar whereby the parts may return to full release position to permit replacement of brake shoes.

21. In combination with a lever of the foundation brake gear, a regulator therefor including a member having ratchet teeth, a freely floating pawl co-operating with the said member, and means for holding said pawl in unyielding engagement with said member except during the regulating operation.

22. In combination with a brake lever, a regulator associated with the lever and comprising a member adapted to be moved with said lever, a relatively fixed member, means including ratchet and pawl mechanism for holding said member against relative movement in one direction, and means for holding the pawl in unyielding holding engagement except during the regulating operation.

23. In a brake adjusting device the combination of a relatively fixed casing, a rack bar connected to a movable part of a brake lever, the free end of said bar extending into the casing, a pawl associated with the rack bar having free movement relative to the casing a distance corresponding to normal brake shoe clearance, said pawl being adapted to be automatically advanced along the rack when the brake lever is moved a distance greater than normal brake shoe clearance and means operable from the exterior of the casing acting directly upon the pawl to disengage the pawl from the rack bar when new brake shoes are to be inserted.

PERCY B. CAMP.
JACK WILSON.

CERTIFICATE OF CORRECTION.

Reissue No. 19,072. February 6, 1934.

PERCY B. CAMP, ET AL.

It is hereby certified that error appears in the printed specification of the above numbered patent requiring correction as follows: Page 3, lines 127 and 128, for "rela- the" read relative; and that the said Letters Patent should be read with this correction therein that the same may conform to the record of the case in the Patent Office.

Signed and sealed this 13th day of March, A. D. 1934.

F. M. Hopkins (Seal) Acting Commissioner of Patents.